(12) United States Patent
Thore

(10) Patent No.: US 6,446,006 B1
(45) Date of Patent: Sep. 3, 2002

(54) METHOD OF PRODUCING IMPACT POINT POSITION PROBABILITY MAPS FOR A WELL

(75) Inventor: Pierre Thore, Pau (FR)

(73) Assignee: Elf Exploration Production, Courbevoie (FR)

( * ) Notice: Subject to any disclaimer, the term of this patent is extended or adjusted under 35 U.S.C. 154(b) by 64 days.

(21) Appl. No.: 09/633,677

(22) Filed: Aug. 7, 2000

(30) Foreign Application Priority Data

Aug. 6, 1999 (FR) .............................. 99 10267

(51) Int. Cl.$^7$ ................................. G01V 1/48
(52) U.S. Cl. ............................. 702/5; 702/16
(58) Field of Search ..................... 702/5, 6, 11, 12, 702/13, 16; 703/10; 367/72, 73

(56) References Cited

U.S. PATENT DOCUMENTS 4,698,759 A * 10/1987 Eliason et al. ................ 702/5
6,106,561 A * 8/2000 Farmer ......................... 703/5

FOREIGN PATENT DOCUMENTS

| FR | 2737909 | 2/1997 |
| FR | 2747490 | 10/1997 |
| FR | 2763702 | 11/1998 |

OTHER PUBLICATIONS

David N. Whitcombe, Fast and Accurate Model Building Using Demigration and Single STE Ray–Trace Migration, 1991, pp. 1295–1296.
P. Thore et al., EAEG, 1996, 2 pages.

* cited by examiner

*Primary Examiner*—Donald E. McElheny, Jr.
(74) *Attorney, Agent, or Firm*—Ostrolenk, Faber, Gerb & Soffen, LLP

(57) ABSTRACT

Method of producing impact point position probability maps for a well. It consists in defining a fixed, invariant target point chosen a priori on an initial location E0 of the surface S, discretizing the surface S with the aid of a grid composed of nodes and of grid cells, assigning at least one elementary geometrical uncertainty vector to each node of the grid of the surface S, determining a statistically significant number of occurrences of locations of the surface S as a function of the geometrical uncertainties affecting it, projecting the target point onto each occurrence of location of the surface so as to deduce a point of impact therefrom, transferring the set of impact points onto the location E0 of the surface S by allocating, to each of these points, surface co-ordinates identical to those which it had on the occurrence of location of the surface containing it.

9 Claims, 6 Drawing Sheets

METHOD OF PRODUCING IMPACT POINT POSITION PROBABILITY MAPS FOR A WELL

Figure 1:
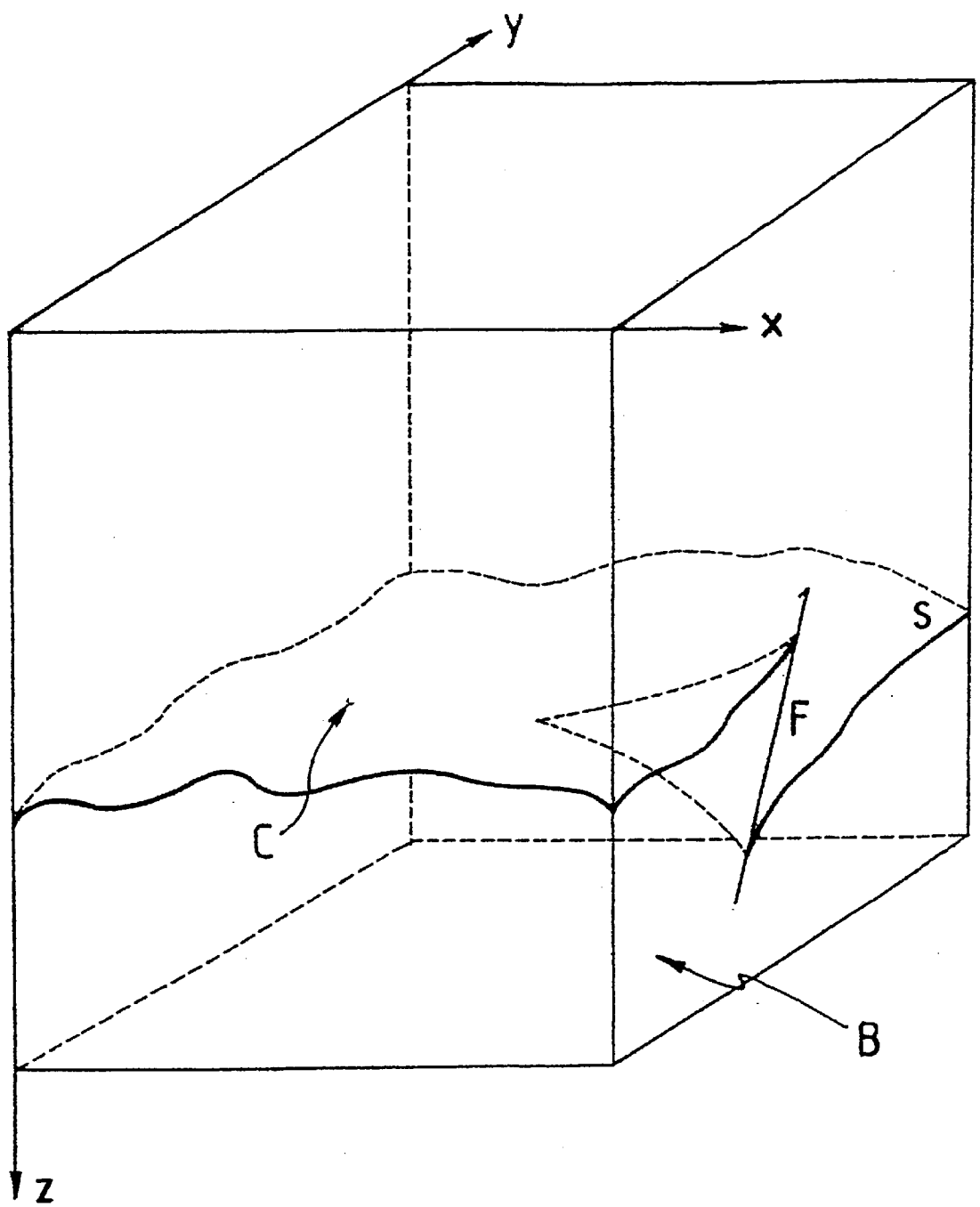

The present invention relates to a method of producing impact point position probability maps for a well over a surface included within a three-dimensional medium and the position of each point of which is known with geometrical uncertainties.

The geometrical position uncertainties are vectors whose components are expressed in units of length, for example in metres, in the three dimensions of the medium.

To ascertain the geometrical structure of the subsurface, it is usual, in oil exploration in particular, to construct what is referred to as a 3D seismic block and the corresponding set of stack velocities. The means for obtaining a 3D seismic block are well known to experts and will not be described in detail. Having obtained a satisfactory seismic block, a migration step is generally carried out. The purpose of the migration operation is to provide the interpreter with an image of the subsurface which is as near as possible to a geological slice.

Two types of migration are chiefly used, namely time migration and depth migration. Time migration provides an acoustic image. Depth migration provides as exact as possible a depthwise image of the subsurface. However, the two types of migration require the prior definition of a velocity model, which can be obtained, for example as proposed by LANDA (Geophysical Prospecting No. 86, pp. 223–243, 1988) or else by WHITCOMBE ($61^{st}$ SEG, Houston, 1991).

In practice, the velocity models are marred by uncertainties, this rendering the results of the migrations inaccurate by the same token. In an article presented at the EAEG 1996 (Amsterdam Jun. 3–4 1996), P.THORE and A.HAAS proposed a practical and simple method for determining the migration errors due to the uncertainty in the velocities, as well as simplified formulae which can be used depending on whether depth migration or time migration is present. These formulae may be regarded as a first-order approximation for determining the direction and modulus of an uncertainty vector in the case of a variable velocity field and provided that one is within the domain of validity of the DIX formula, that is to say with uniform lateral variations in velocities in respect of plane and moderately-sloping reflectors.

In the patent FR-A-2 763 702, there is described a method of producing risk maps for the positioning of a well within a medium as a function of migration errors due to the uncertainty in the velocity field. The object of the method is to perform as many migrations of a seismic horizon as one has possible velocities and to tick off the points of impact of a fixed drilling well on each occurrence of location of the migrated horizon.

Moreover, the determination of a trajectory of a drilling well depends, on the one hand, on the choice of a departure point and, on the other hand, on the choice of a target point to be reached in the subsurface. Conventionally, the target point lies on a surface present in the 3D seismic block, the said surface constituting a seismic horizon. Given that the locations of the seismic horizons are affected by geometrical uncertainty vectors, the target point can only have an accurate position on one and only one occurrence of location of the horizon. In fact, each occurrence of location of the horizon gives rise to a new position of the target point and the union of a large number of these positions offers a distribution of the points of impact of the drilling well on the horizon.

In French patent application number 99 02 088 of Feb. 19, 1999, there is described a method for determining an optimal trajectory in order to reach a fuzzy target in a medium from a remote point. The method uses the geometrical uncertainties affecting a volume in order to determine an optimal trajectory for drilling. The volume is probabilized with the aid of the geometrical uncertainties and the optimal trajectory is that which best traverses the probabilized volume.

The subject of the present invention is a method making it possible to chart an impact point position probability map for a perfectly determined drilling well over a surface included within a three-dimensional medium with axes x, y, z and whose location is known with geometrical uncertainties. In particular, the said surface is a seismic horizon included within a seismic block defined in a three-dimensional reference frame with axes x, y, z and the location of the horizon is marred by uncertainties.

The method according to the invention relates to positioning risk. However, although its purpose is to chart risk maps, it does not do this by constructing successive migrations according to various velocities as in FR-A-2 763 702. More precisely, the method remedies the deficiencies of the method described in FR-A-2 763 702 by taking account of all the causes of uncertainties which affect the location of a horizon in the subsurface so as to chart an impact point position probability map.

Moreover, although the method according to the invention uses the geometrical uncertainties, its purpose is not to calculate an optimal trajectory as is described in French patent application number 99 02 088.

Figure 7:
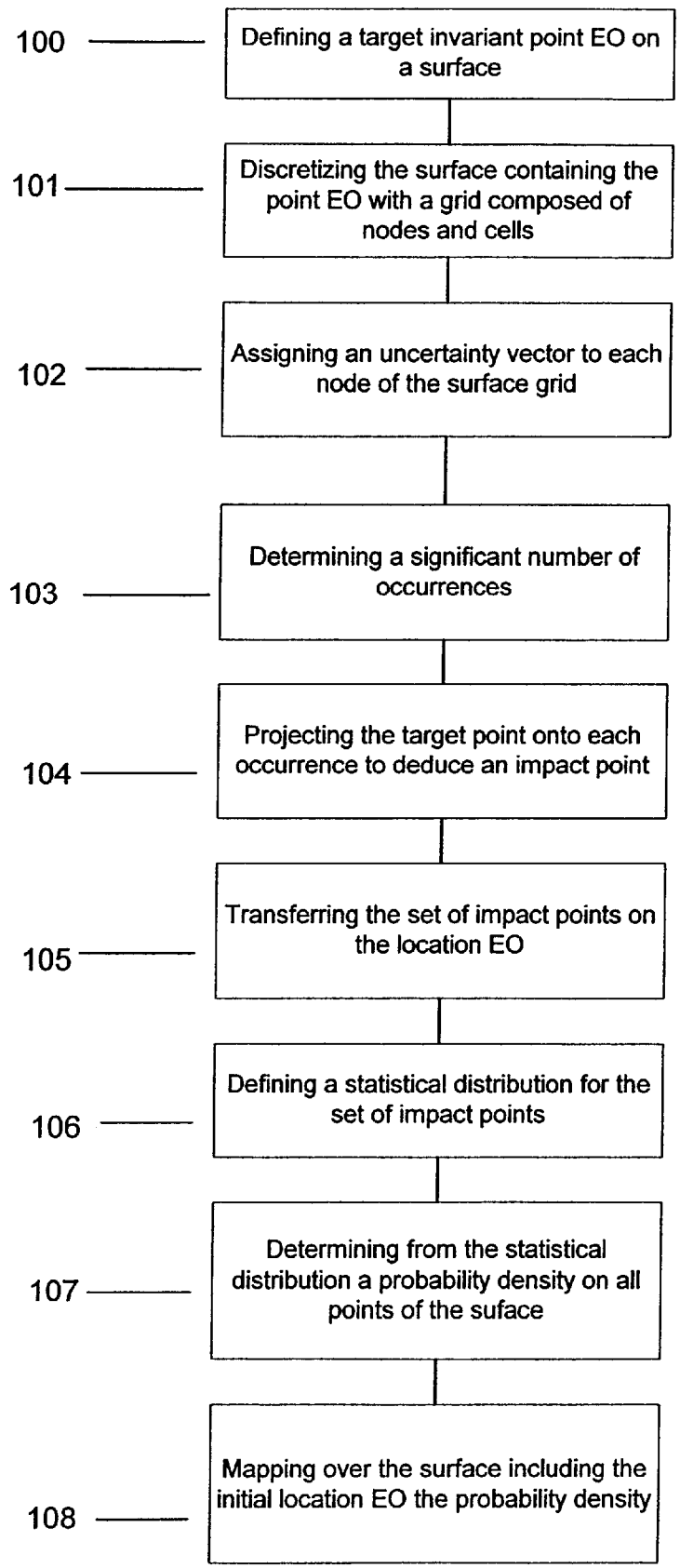

Referring to FIG. 7, the method, according to the invention, of producing impact point position probability for maps for a well over a surface S included within a three-dimensional medium and whose location is known with given geometrical uncertainties, is characterized in that it consists in:

defining a fixed, invariant target point chosen a priori on an initial location EO of the surface S (step 100), discretizing the surface S with the aid of a grid composed of nodes and of grid cells (step 101), assigning at least one elementary geometrical uncertainty vector to each node of the grid of the surface S (step 102), determining a statistically significant number of occurrences of locations of the surface S as a function of the geometrical uncertainties affecting it (step 103), projecting the target point onto each occurrence of location of the surface S so as to deduce a point of impact therefrom (step 104), transferring the set of impact points onto the location EO of the surface S by allocating, to each of these points, surface co-ordinates identical to those which it had on the occurrence of location of the surface containing it (step 105), defining over the surface S a statistical distribution for the set of impact points (step 106), determining from the statistical distribution a probability density at all points of the surface S, the said density giving the probability that any point of the surface S is a point of impact (step 107), and mapping over the location EO of the surface S the probability density as level curves (step 108).

According to a characteristic of the invention, the occurrences of locations of the surface are obtained by random drawings of the elementary uncertainty vectors.

According to another characteristic of the invention, several elementary geometrical uncertainty vectors are allocated at each node of the grid of the surface and a global uncertainty vector, which is the result of the said elementary geometrical uncertainty vectors, is calculated and is assigned to the relevant node.

According to another characteristic, the surface S being a seismic horizon defined by a pick and a depth migration, three elementary geometrical uncertainty vectors are allocated to each node of the grid of the seismic horizon, these being an uncertainty vector regarding the pick of the horizon, an uncertainty vector regarding the depth migration and an uncertainty vector regarding a seismic tie of the horizon to at least one drilling of the medium, so as to calculate the resultant vector of the said vectors.

According to another characteristic of the invention, at each node of the horizon, the elementary geometrical uncertainties vary in magnitude without varying in direction.

According to another characteristic of the invention, the variations in direction of the elementary geometrical uncertainties at each node of the horizon are predetermined.

According to another characteristic of the invention, at neighbouring nodes of the surface, the magnitudes of the resultant uncertainty vectors exhibit values such that the said nodes do not move independently of one another during the determination of each occurrence of location of the surface.

According to another characteristic of the invention, when the surface is traversed by at least one fracture, the points of contact of the surface with the fracture, as well as the part of the fracture plane which connects the pieces of the surface together are secured to the surface during the determination of each of its occurrences of location.

According to another characteristic of the invention, the determination of the probability density of the presence of any point of impact on the surface from the distribution of the impact points consists in:

inscribing the set of impact points within a quadrilateral standing on the surface S,
  gridding the quadrilateral with the aid of grid cells all having the same area,
  allocating each grid cell a probability value equal to the ratio of the number of impact points which traverse it to the total number of impact points inscribed within the quadrilateral.

Figure 2:
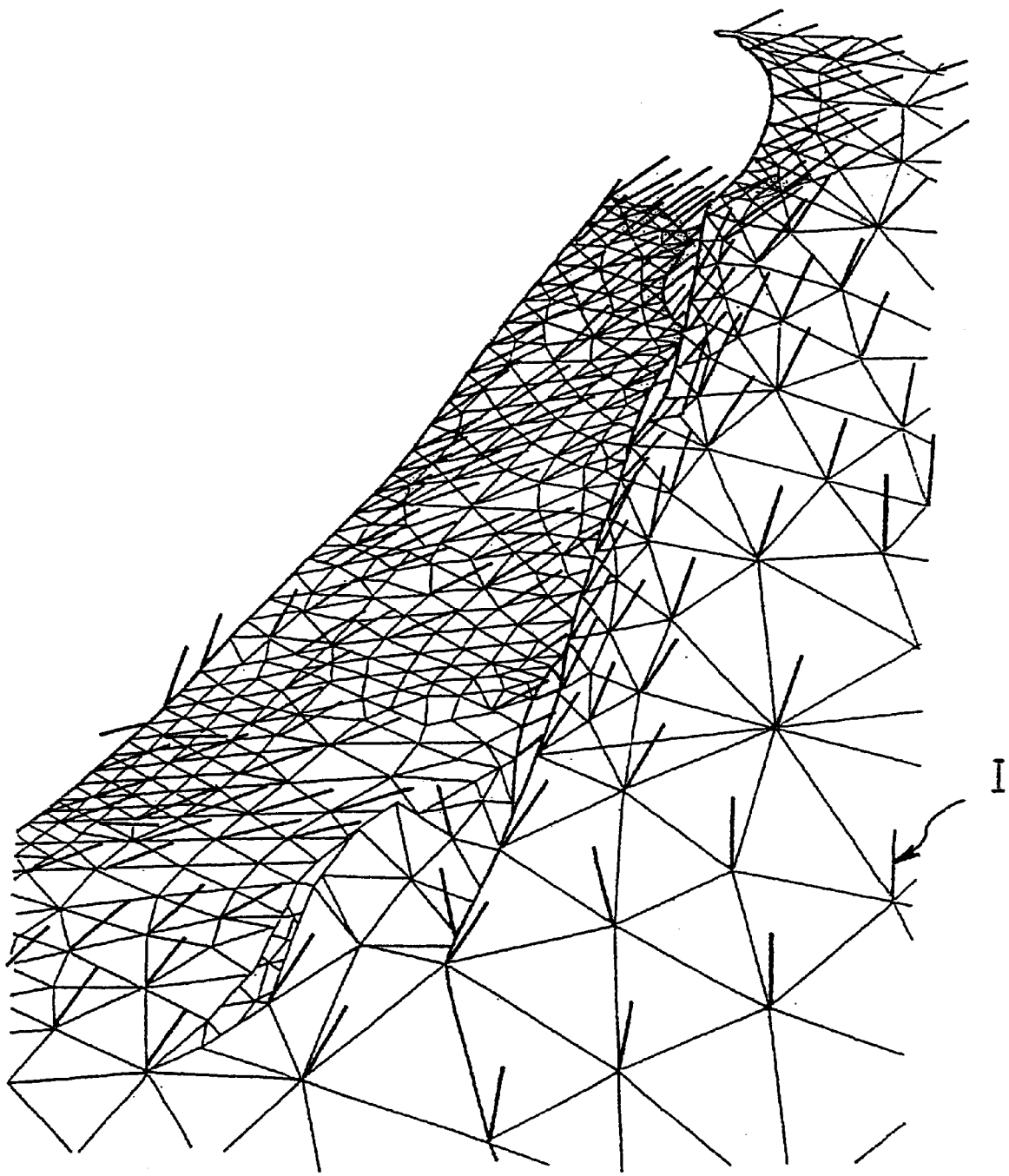
Figures 3, 3A:
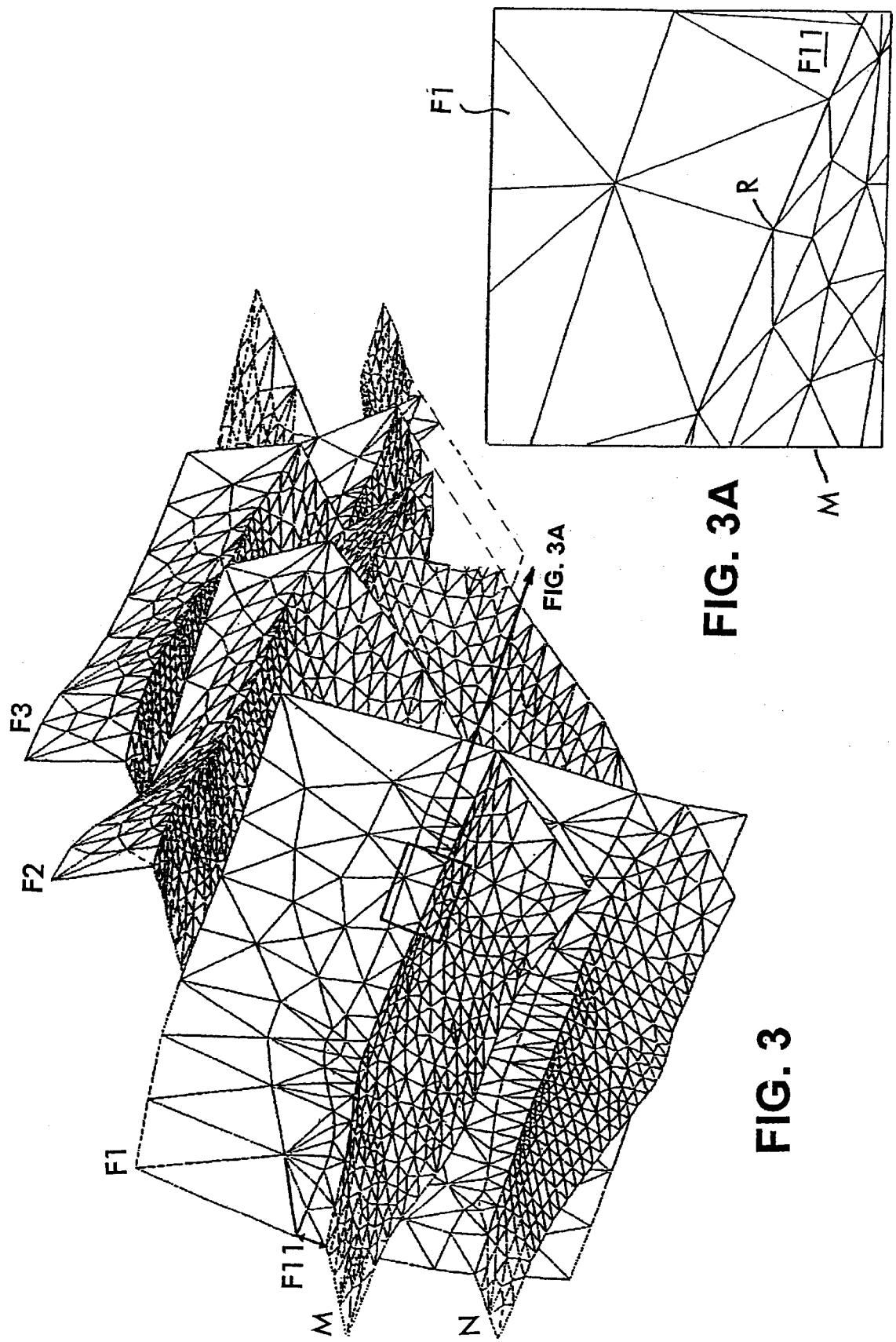
Figure 4:
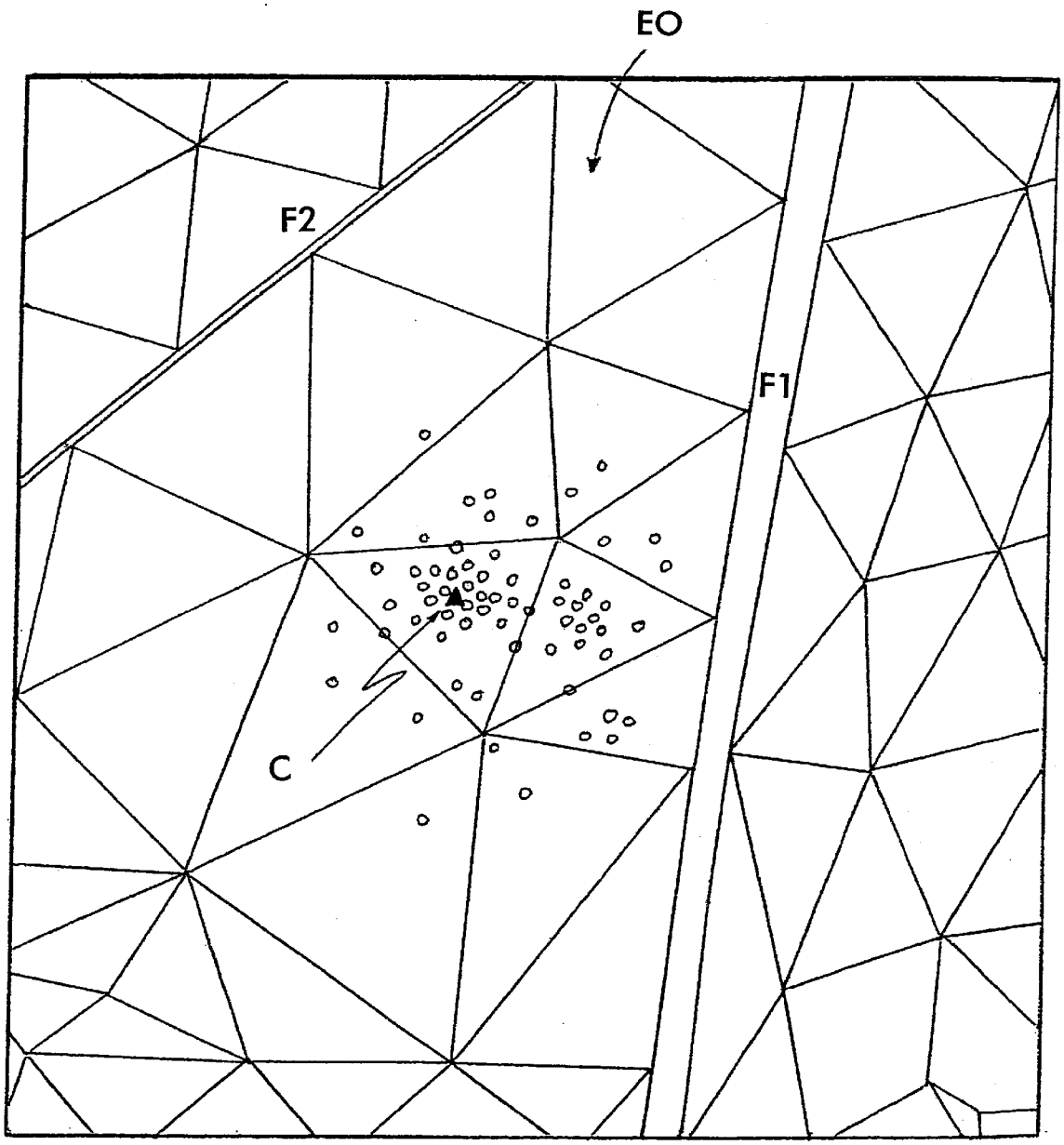
Figure 5:
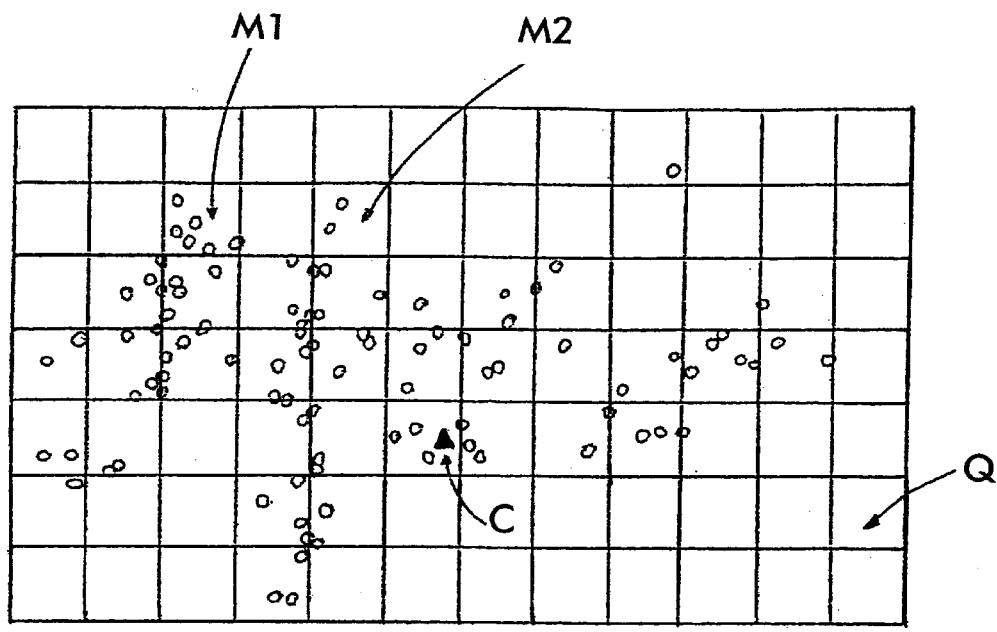
Figure 6:
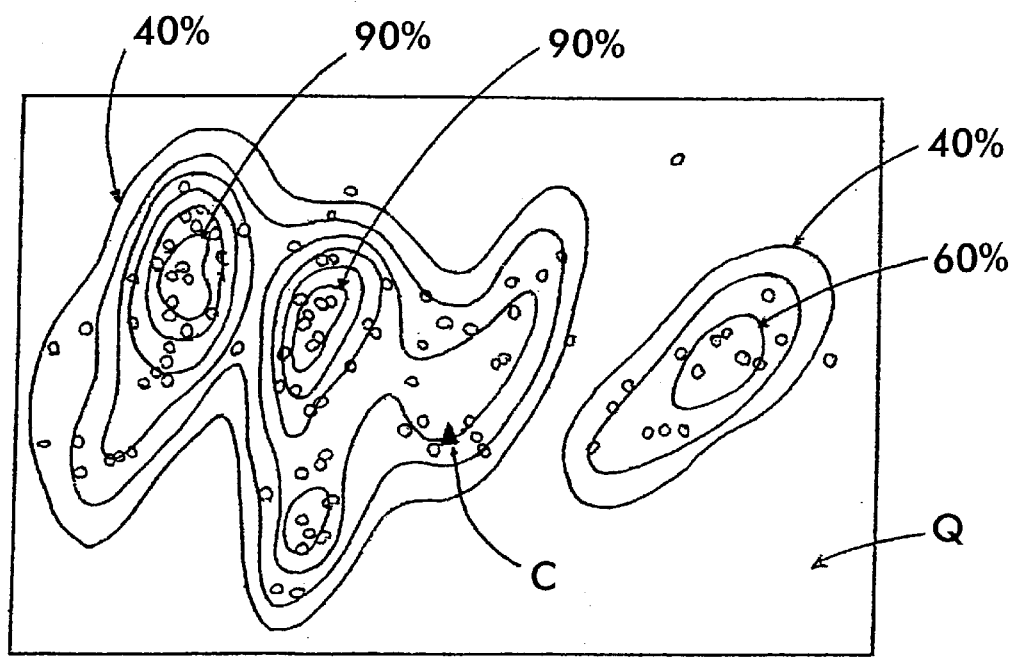

In an advantageous implementation of the method according to the invention:

the target point C is defined as a point with co-ordinates Cx, Cy and Cz chosen a priori on an initial location of a surface in a three-dimensional medium,
  the surface is fully gridded,
  a set (n-tuple) of elementary geometrical uncertainty vectors is allocated to each node of the grid,
  a random drawing of the magnitudes of the elementary uncertainty vectors is carried out at each node of the surface, then the resultant of the said vectors is formed and each node is moved according to the resultant uncertainty vector allocated to it, each set of new positions of the nodes defining a new occurrence of location of the surface,
  the target point is projected vertically onto each occurrence of location of the surface so as to deduce therefrom a new point of impact,
  each point of impact is transferred onto the initial location of the surface by allocating it, on this location, surface co-ordinates identical to those which it had on its own occurrence of location of surface,
  a quadrilateral circumscribed about the set of impact points and standing on the surface is determined,
  a secondary grid of the quadrilateral is constructed with the aid of secondary grid cells of mutually equal areas,
  the number of impact points associated with each secondary grid cell is counted, which operation produces a distribution in the form of a histogram in the two dimensions defining the surface S,
  a probability density is defined, on the basis of the histogram, in two dimensions by allocating each secondary grid cell a probability equal to the ratio of the number of impact points which reach it to the total number of impact points contained in the quadrilateral,
  the probability of the presence of an impact point anywhere on the surface is calculated by using the two-dimensional probability density, and
  impact point isoprobability curves are plotted on the surface The invention will be better understood on reading the following description of an embodiment illustrated by the appended drawings in which:

FIG. 1 is a diagrammatic representation of a 3D seismic block containing a surface, featuring a seismic horizon, and a target point, FIG. 2 represents a grid of a seismic horizon imaging the roof of an oil reservoir affected by uncertainty vectors at each node of the grid, FIG. 3 shows the roof and the base of an oil reservoir in its entirety, the said reservoir being split into four compartments by three faults, FIG. 3a being an enlargement of a contact of the roof with a fault, FIG. 4 shows the roof of the gridded oil reservoir of FIG. 2 traversed by two faults and in which have been indicated a target point and the actual impact points, FIG. 5 shows a gridded quadrilateral circumscribed about several impact points and lying on the roof of the oil reservoir, FIG. 6 shows curves of isoprobability of impact on the roof of the oil reservoir, deduced from the distribution of the impact points of FIG. 5.

FIG. 7 shows a flow chart of a method according to the present invention.

Represented in. FIG. 1 is a three-dimensional seismic block B with axes x, y and z. The block has been obtained by conventional processing of seismic reflection data acquired in this block and is supplemented with an analysis performed by the interpreters. Inside a seismic block, one conventionally distinguishes more or less continuous seismic horizons. The horizons are treated as boundaries of sediment beds and the discontinuities as fractures or faults.

Inside the seismic block B has been represented a single seismic horizon, namely the surface S featuring, for example, the roof of an oil reservoir. This surface is generally affected by faults, only one F of which is represented in FIG. 1.

FIG. 1 also shows a target point C chosen and fixed once and for all inside the block B. The target point C, regarded as invariant, is situated on a location E0 chosen a priori of the surface S. In reality, the target point lies in an immediate neighbourhood of the surface S since the location of the latter is known inaccurately.

The surface and the faults affecting it are discretized by a grid composed of nodes and grid cells. The grid appears as a triangulation of the surface and the greater the oil interest, the finer the grid. At each node of the grid, the surface S is allocated a global geometrical uncertainty vector I which varies in magnitude and in direction (FIG. 2).

The position of each node of the surface is thus known with a global geometrical uncertainty I, this being defined by a vector having three components Ix, Iy and Iz along the three axes of the reference frame of the seismic block.

The medium represented by the block B being a portion of the subsurface and the surface S being a seismic horizon defined by a pick and a depth migration of seismic data relating to the said portion, three elementary geometrical uncertainty vectors, or triplet, are allocated to each node of the grid of the horizon, namely: an uncertainty Ip regarding the pick of the horizons, an uncertainty Im regarding the depth migration and an uncertainty If regarding the seismic tie with respect to at least one drilling of the subsurface. The elementary geometrical uncertainties are given in the form of three vectors, each vector being accompanied by its own absolute uncertainty. The expression seismic tie is understood to mean the matching of the seismic horizons with their locations observed in a drilling well.

For example, the elementary uncertainty vector Ip regarding the pick possesses an absolute uncertainty dIp. In the method according to the invention, one then regards a probability density function as being associated with the vector Ip, which function is advantageously a gaussian density function with zero mean and standard deviation dIp.

At each node, a modulus is determined for each elementary uncertainty vector by applying a Monte-Carlo type method which associates an elementary uncertainty vector with a randomly drawn number between 0 and 1.

At each node of the surface, the components of each member vector of the triplet (Ip, Im, If) are thus determined by random drawing, and then the resultant I of these vectors is formed. Each node is thereafter moved in the block B in the direction of the vector I and by an amount corresponding to its modulus.

When the random drawings have been performed for all the nodes lying in the surface S, an occurrence of location of the said surface S is obtained. The number of occurrences of location of the surface is regarded as statistically significant when at least 30 to 50 occurrences of location have been determined; preferably, the number of occurrences of location is of the order of several hundred, or even several thousand, this generally depending on the number of nodes lying in the surface S.

So as not to generate unnatural surfaces (too crumpled) when moving the nodes, a certain rigidity is allocated to the surface. This rigidity is simulated by acting on the random drawings. Thus, in the course of the random drawings of the uncertainty vectors, in particular with the Monte-Carlo method, one takes randomly drawn values which are substantially similar to one another for neighbouring points on the surface. This signifies that at neighbouring nodes of the surface S, the magnitudes of the resultant uncertainty vectors exhibit values such that the said nodes do not move independently during the determination of each occurrence of location of the surface S.

FIG. 3 illustrates the tethering of the horizons to the fractures which intersect them, as appropriate. The figure shows an oil reservoir bounded above by its roof or surface M and below by its base or surface N. The reservoir is split into four compartments by three faults F1, F2 and F3. Magnification of the contact between the fault F1 and the roof M (FIG. 3a) indicates how the grids of the horizons and of the faults connect together by sharing common nodes. The portion of the fault F1, marked F 11, is regarded as forming an integral part of the roof of the reservoir M during each movement of the roof by random drawing of the elementary uncertainty vectors affecting it. For example, the node R, situated at the contact of the roof M with the fault F1, is common to the grids of the roof M and of the fault F1. Therefore, the points of contact of the surface M with the fault or the fracture F1, as well as the part F11 of the fault plane which connects the pieces of the surface M together, are secured to the surface M during the determination of each of its occurrences of location.

In a following step, the invariant target point C having co-ordinates Cx, Cy and Cz is projected preferably vertically onto each occurrence of location of the surface S so as to determine a point of impact. Thereafter, the set of impact points thus determined is transferred onto the location E0 of the surface S by allocating each impact point, on this location E0, surface co-ordinates identical to those which it had on the occurrence of location of the surface S associated with this impact point. The surface co-ordinates of a point on the surface S are understood to be co-ordinates with respect to a pair of axes carried by the surface S.

FIG. 4 represents a view from above of a surface gridded on the basis of a triangular grid. The surface is cut by two faults F1 and F2. At the centre of the figure, a small triangle represents the target point C taken on the location E0 chosen a priori of the surface S. On either side of the small triangle can be seen a cluster of impact points depicted by small rings. Each small ring represents the position of a point of impact on an occurrence of location of the surface, which location is of course different from that location E0 of the surface which was chosen a priori as support for the cluster of impact points. The set of points of impact of the location E0 constitutes a statistical distribution since each point of impact is associated with an occurrence of location of the surface S. The number of impact points is therefore statistically significant.

A probability density is defined at every point of the surface S from the distribution of impact points, the said density making it possible to obtain the probability that any point of the said surface S is a point of impact.

The set of impact points of FIG. 4 situated around the target point C is inscribed within a quadrilateral Q, for example a rectangle as represented in FIG. 5. The quadrilateral Q is gridded with the aid of a regular secondary grid, preferably with square grid cells all having the same area. Next, each grid cell of the quadrilateral Q is allocated a value of impact probability equal to the ratio of the number of impact points which it contains to the total number of impact points inscribed within the quadrilateral Q.

FIG. 5 shows a zoom on a cluster of impact points. The cluster is here inscribed within the quadrilateral Q which supports a secondary grid based on square grid cells of mutually equal area. The impact points are counted grid cell by grid cell, for example grid cell M1 contains 6 impact points, grid cell M2 contains 2 impact points, etc. The grid cells being all of equal area and the various positions of the surface S all being equiprobable, the ratio of the number of impact points contained in a given grid cell to the total number of impact points is treated as the probability of reaching the given grid cell during drilling. The operation of counting the number of impact points associated with each grid cell of the secondary grid of the quadrilateral Q produces a distribution in the form of a histogram in the two dimensions which define the surface S. A two-dimensional probability density is determined from the histogram thus produced.

In a last step, the probability density is mapped over the location E0 of the surface S as probability isovalue curves or isoprobability curves.

FIG. 6 represents the final result on completing the application of the method. The same cluster of points as that of FIG. 5 may be seen, encompassed by impact isoprobability curves. The higher the number of impact point determinations and the more closely spaced the secondary grid, the greater is the accuracy of these curves.

What is claimed is:

1. Method of producing impact point position probability maps for a well over a surface S included within a three-dimensional medium and whose location is known with geometrical uncertainties, characterized in that it consists ir:

defining a fixed, invariant target point chosen a priori on an initial location E0 of the surface S, discretizing the surface S with the aid of a grid composed of nodes and of grid cells, assigning at least one elementary geometrical uncertainty vector to each node of the grid of the surface S, determining a statistically significant number of occurrences of locations of the surface S as a function of the geometrical uncertainties affecting it, projecting the target point onto each occurrence of location of the surface so as to deduce a point of impact therefrom, transferring the set of impact points onto the location E0 of the surface S by allocating, to each of these points, surface co-ordinates identical to those which it had on the occurrence of location of the surface containing it, defining over the surface S a statistical distribution for the set of impact points, determining from the statistical distribution a probability density at all points of the surface S, the said density giving the probability that any point of the surface S is a point of impact, and mapping over the surface S the probability density as level curves.

2. Method according to claim 1, characterized in that the occurrences of locations of the surface are obtained by random drawings of the elementary uncertainty vectors.

3. Method according to claim 1, characterized in that several elementary geometrical uncertainty vectors are allocated at each node of the grid of the surface and that a global uncertainty vector, which is the result of the said elementary geometrical uncertainty vectors, is calculated and is assigned to the relevant node.

4. Method according to claim 3, characterized in that the surface S being a seismic horizon defined by a pick and a depth migration, three elementary geometrical uncertainty vectors are allocated to each node of the grid of the seismic horizon, these being an uncertainty vector regarding the pick of the horizon, an uncertainty vector regarding the depth migration and an uncertainty vector regarding a seismic tie of the horizon to at least one drilling of the medium, so as to calculate the resultant vector of the said vectors.

5. Method according to claim 4, characterized in that at each node of the horizon, the elementary geometrical uncertainties vary in magnitude without varying in direction.

6. Method according to claim 5, characterized in that the variations in direction of the elementary geometrical uncertainties at each node of the horizon are predetermined.

7. Method according to claim 4, characterized in that at neighbouring nodes of the surface, the magnitudes of the resultant uncertainty vectors exhibit values such that the said nodes do not move independently of one another during the determination of each occurrence of location of the surface.

8. Method according to claim 1, characterized in that, when the surface is traversed by at least one fracture, the points of contact of the surface with the fracture, as well as the part of the fracture plane which connects the pieces of the surface together are secured to the surface during the determination of each of its occurrences of location.

9. Method according to claim 1, characterized in that the determination of the probability density of the presence of any point of impact on the surface from the distribution of the impact points consists in:

inscribing the set of impact points within a quadrilateral standing on the surface S, gridding the quadrilateral with the aid of grid cells all having the same area, allocating each grid cell a probability value equal to the ratio of the number of impact points which traverse it to the total number of impact points inscribed within the quadrilateral.

* * * * *